(12) United States Patent
Wobbe

(10) Patent No.: US 7,195,724 B2
(45) Date of Patent: Mar. 27, 2007

(54) METHOD OF CONTROLLING A COMPOUNDER-TYPE INJECTION MOLDING MACHINE, AND COMPOUNDER-TYPE INJECTION MOLDING MACHINE

(75) Inventor: Hans Wobbe, Herrsching (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 238 days.

(21) Appl. No.: 10/320,275

(22) Filed: Dec. 16, 2002

(65) Prior Publication Data

US 2003/0116876 A1 Jun. 26, 2003

(30) Foreign Application Priority Data

Dec. 21, 2001 (GB) ................. 101 63 409

(51) Int. Cl.
B29C 45/77 (2006.01)
(52) U.S. Cl. .................... 264/40.4; 264/40.7
(58) Field of Classification Search ........... 264/40.4, 264/40.7; 425/140, 146, 147, 148
See application file for complete search history.

(56) References Cited

U.S. PATENT DOCUMENTS

| 3,391,232 | A | * | 7/1968 | Jackson | 264/40.7 |
| 3,728,056 | A | * | 4/1973 | Theysohn | 425/142 |
| 4,013,745 | A | * | 3/1977 | Brinkmann et al. | 264/37.32 |
| 4,213,747 | A | * | 7/1980 | Friedrich | 425/144 |
| 4,448,736 | A | * | 5/1984 | Emery et al. | 264/40.1 |
| 4,671,908 | A | * | 6/1987 | Gwinn et al. | 264/40.7 |
| 4,678,420 | A | | 7/1987 | Inoue | |
| 5,122,315 | A | * | 6/1992 | Darley | 264/40.1 |
| 5,185,117 | A | * | 2/1993 | Hawley | 264/211.12 |
| 5,409,647 | A | * | 4/1995 | Kiefer et al. | 264/40.4 |
| 2001/0048181 | A1 | | 12/2001 | Shah et al. | |

FOREIGN PATENT DOCUMENTS

| DE | 28 57 740 C1 | 8/1979 |
| DE | 295 15 725 U1 | 6/1996 |
| JP | 62 198417 | 9/1987 |
| JP | 05 131509 | 5/1993 |
| JP | 2000 334775 | 12/2000 |
| WO | WO 98/23433 | 6/1998 |

* cited by examiner

*Primary Examiner*—Christina Johnson
*Assistant Examiner*—Monica A Huson
(74) *Attorney, Agent, or Firm*—Henry M. Feiereisen; Ursula B. Day

(57) ABSTRACT

In a method of controlling the feed amount of compounding materials for a compounder-type injection molding machine with a plasticizing unit, an injection unit, receiving plasticized material from the plasticizing unit, and a metering unit for supply of starting material into the plasticizing unit, the volume of a mass stream downstream of the plasticizing unit is ascertained and the metering unit is operated in response to the ascertained volume.

6 Claims, 3 Drawing Sheets

METHOD OF CONTROLLING A COMPOUNDER-TYPE INJECTION MOLDING MACHINE, AND COMPOUNDER-TYPE INJECTION MOLDING MACHINE

CROSS-REFERENCES TO RELATED APPLICATIONS

This application claims the priority of German Patent Application, Serial No. 101 63 409.9-51, filed Dec. 21, 2001, pursuant to 35 U.S.C. 119(a)–(d), the disclosure of which is incorporated herein by reference.

BACKGROUND OF THE INVENTION

The present invention relates to a control or regulating method for a compounder-type injection molding machine.

Compounders are devices for fabricating plastic articles and include essentially a plasticizing unit, which accommodates a screw and receives compounding materials such as plastic granulates, fiber materials and other compounding materials from one or more metering units. These materials are plasticized and advanced in longitudinal direction of the plasticizing unit to a header, as the screw rotates, for transfer to an injection unit in the form of a piston and cylinder arrangement. The injection unit injects the plasticized and heated plastic material into a mold for producing the finished plastic article.

The plastic granulates or like materials are typically fed via lateral metering devices or feed hoppers to the plasticizing unit continuously or intermittently or in dependence on the filling level of the plasticizing unit. Hereby, it may happen that depending on the operating conditions excessive or insufficient amounts of material are supplied. Moreover, the metered amounts have to be readjusted, each time a new article is intended for production.

It would therefore be desirable and advantageous to provide an improved method of controlling or regulating a compounder-type injection molding machine, to obviate prior art shortcomings and to prevent supply of incorrect amounts of materials, without requiring a readjustment, when different amounts are necessary upon an article change.

SUMMARY OF THE INVENTION

According to one aspect of the present invention, a method of controlling the feed amount of compounding materials for a compounder-type injection molding machine with a plasticizing unit, an injection unit receiving plasticized material from the plasticizing unit, and a metering unit for supply of starting material into the plasticizing unit, said method comprising the steps of ascertaining the volume of a mass stream downstream of the plasticizing unit, and operating the metering unit in response to the ascertained volume.

The present invention resolves prior art problems by proposing to make the volume amount of material to be introduced by the metering unit into the plasticizing unit dependent on the volume downstream the plasticizing unit, i.e. to correspond the volume of starting material being introduced from the metering unit into the plasticizing unit to the volumetric mass stream discharged downstream of the plasticizing unit.

According to another feature of the present invention, the volume of the mass stream may be determined on the basis of a cycle time and/or stroke volume of the injection unit. Short cycle times thus mean an increase in the metered amount while long cycle times mean a decrease in the metered amount. On the other hand, a great stroke volume is accompanied by an increase in the metered amount, while a small stroke volume is accompanied by a decrease in the metered amount.

According to another aspect of the present invention, a method of regulating the feed amount of compounding materials for a compounder-type injection molding with a plasticizing unit, an injection unit receiving plasticized material from the plasticizing unit, and a metering unit for supply of starting material into the plasticizing unit, said method comprising the steps of ascertaining a pressure in a header of the plasticizing unit, and operating the metering unit in response to the ascertained pressure in the header.

In this type of control system, the pressure in the header of the plasticizing unit of the compounder is ascertained and used as command variable for operating the metering unit. Excessive pressure in the header of the plasticizing unit indicates that too much compounding materials is supplied, while low pressure in the header of the plasticizing unit indicates that insufficient amount of compounding materials is supplied. In this way, the metered stream of the metering unit is changed inversely proportional to changes in pressure.

The novel and inventive method of the invention is also applicable for simultaneous control of several metering units for supply of plastic material to the same plasticizing unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
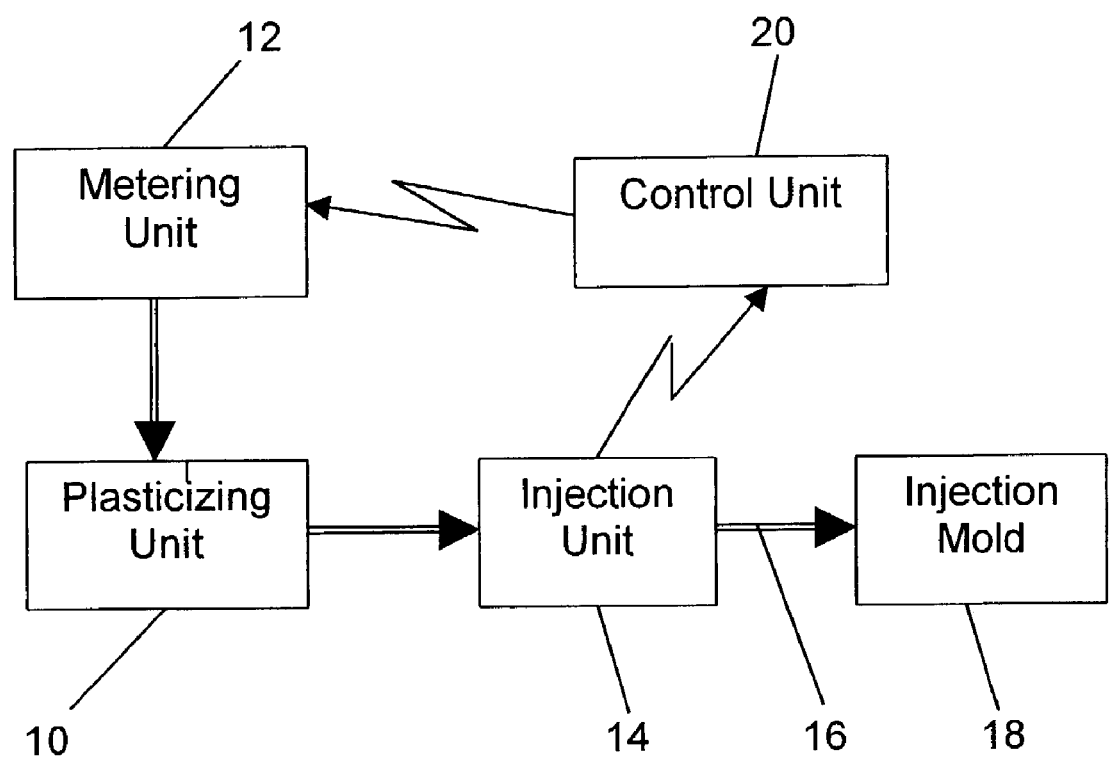
FIG. 1 is a schematic block diagram of a first embodiment of a principal configuration of a method according to the present invention with reference to a compounder-type injection molding machine.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic block diagram of a first embodiment of a principal configuration of a method according to the present invention with reference to a compounder-type injection molding machine, including a plasticizing unit 10 which may be a twin screw extruder with screws rotating in opposite or same directions, or a single screw extruder. Various materials can be introduced into the plasticizing unit 10 via one or more metering units 12. For example, plastic granulates may be supplied via one metering unit whereas fibers or other additives may be supplied into the plasticizing unit 10 via another metering unit. Only one metering unit 12 is shown in FIG. 1 for the sake of simplicity. A rotation of the screw or screws in the plasticizing unit 10 results in a plastification of the material being introduced and advance thereof towards a header 10a (FIG. 2) of the plasticizing unit 10 for transfer to an injection unit 14 configured in the form of a piston and cylinder arrangement. The injection unit 14 is in fluid communication via a passageway 16 with an injection mold 18 for molding the incoming plasticized and heated plastic material to a finished plastic article.

Structure and mode of operation of compounder-type injection molding machines are generally known to a person skilled in the art so that a further description thereof is omitted for the sake of simplicity. A specific construction and manner in which a compounder-type injection molding machine of this type is typically operated is fully described in commonly assigned copending patent application by a different inventive entity, entitled "Compounder-type Injection Molding Machine", filed Oct. 22, 2002, the disclosure of which is incorporated herein by reference.

In accordance with the present invention, the compounder-type injection molding machine includes a control unit 20 which receives an output signal representative of the volume of the mass stream downstream of the plasticizing unit 10 and operates the metering unit 12 in dependence on the ascertained volume of the mass stream. Suitably, the volume of the mass stream is ascertained as a function of the cycle time and/or the stroke volume of the injection unit 14. Thus, when the injection unit 14 operates at short cycle times, the metered amount of starting material introduced by the metering unit 12 into the plasticizing unit 10 is increased, while long cycle times mean a decrease in the metered amount. Conversely, a great stroke volume is accompanied by an increase in the metered amount, while a small stroke volume is accompanied by a decrease in the metered amount.

Figure 2:
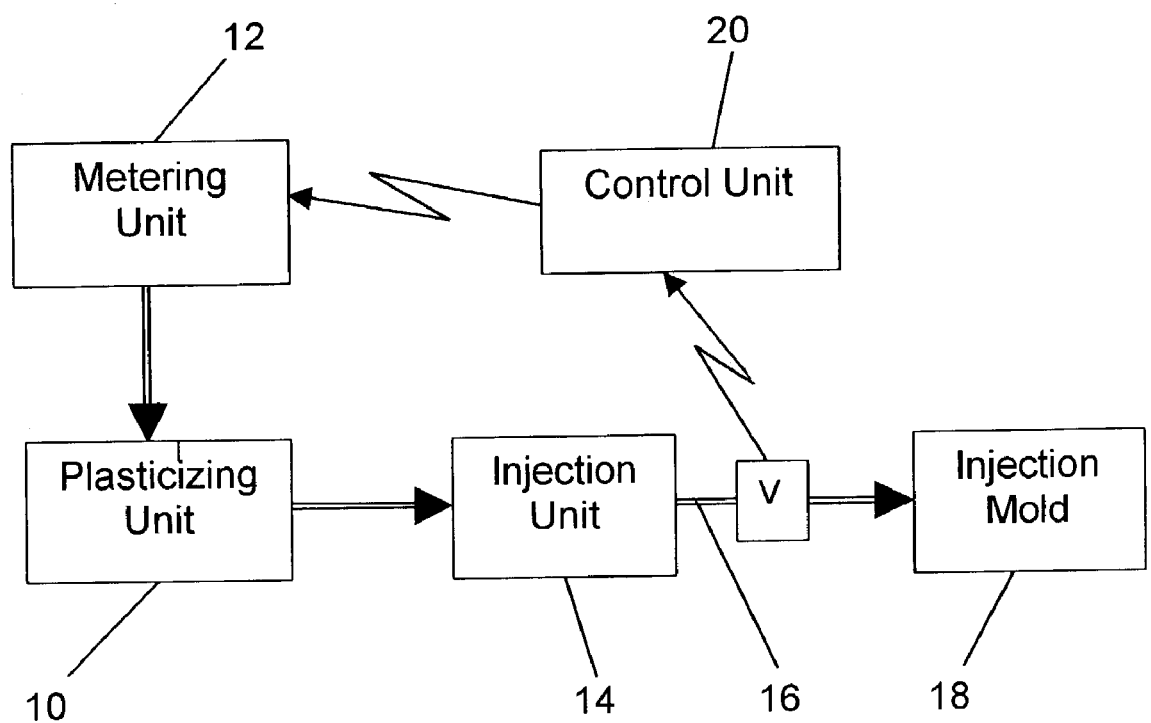
FIG. 2 is a schematic block diagram of a modified arrangement for implementing the principal configuration of the method of FIG. 1.

FIG. 2 shows a schematic block diagram of a modified arrangement for implementing the principal configuration of the method of FIG. 1. Parts corresponding with those in FIG. 1 are denoted by identical reference numerals and not explained again. In this modification, the volume of the mass stream expelled from the injection unit 14 is determined by a flow volume measuring device V which is disposed in the passageway 16 between the injection unit 14 and the injection mold 18 and generates an output signal representative of the volume of the mass stream. The output signal is transmitted to the control unit 20 for controlling the volume of material from the metering unit 12 to the plasticizing unit 10 to correspond to the ascertained volume of the mass stream through the passageway 16.

Figure 3:
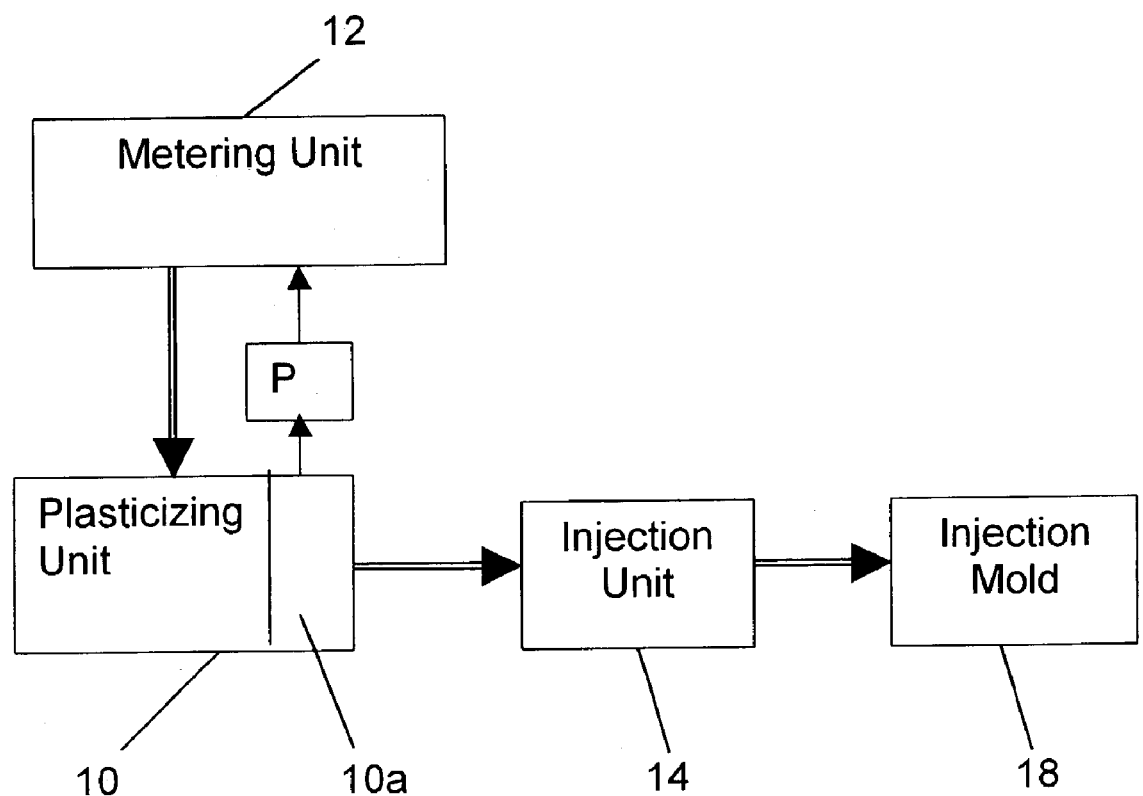
FIG. 3 is a schematic block diagram of a second embodiment of a principal configuration of a method according to the present invention with reference to a compounder-type injection molding machine.

Turning now to FIG. 3, there is shown a schematic block diagram of a second embodiment of a principal configuration of a method according to the present invention with reference to a compounder-type injection molding machine. Parts corresponding with those in FIG. 1 are denoted by identical reference numerals and not explained again. The description below will center on the differences between the embodiments. In the embodiment of FIG. 3, provision is made for a pressure measuring device P which ascertains the pressure in header 10a of the plasticizing unit 10 to generate a command variable for operating the metering unit 12.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method of controlling the feed amount of compounding materials for a compounder-type injection molding machine with a plasticizing unit, an injection unit receiving plasticized material from the plasticizing unit, a first metering unit for supply of a first compounding material to the plasticizing unit, and a second metering unit for supply of a second compounding material to the plasticizing unit, said method comprising the steps of:

ascertaining the volume of a mass stream of the compounded plasticized material downstream of the plasticizing unit of the injection molding machine in a continuous manner; and operating at least one of the first and second metering units in response to the continuously ascertained volume to control a composition of the plasticized material, wherein the operating step is implemented to correspond the volume of the mass stream downstream of the injection unit to the volume of compounded material introduced by the respective metering unit into the plasticizing unit, wherein the volume of the mass stream is determined on the basis of at least one of a cycle time and stroke volume of the injection unit.

2. A method of controlling the feed amount of compounding materials for a compounder-type injection molding machine with a plasticizing unit, an injection unit receiving plasticized material from the plasticizing unit, a first metering unit for supply of a first compounding material to the plasticizing unit, and a second metering unit for supply of a second compounding material to the plasticizing unit, said method comprising the steps of:

ascertaining the pressure of a mass stream of the compounded plasticized material in a header of the plasticizing unit of the injection molding machine in a continuous manner; and operating at least one of the first and second metering units in response to the continuously ascertained pressure to control a composition of the compounded plasticized material, wherein the pressure of the mass stream is determined on the basis of at least one of a cycle time and stroke volume of the injection unit.

3. The method of claim 2, for controlling such metering units by control units.

4. The method of claim 2, wherein the metering unit issues a metered stream which is changed inversely proportional to the changes in pressure.

5. A method of controlling the feed amount of compounding materials for a compounder-type injection molding machine with a plasticizing unit, an injection unit receiving plasticized material from the plasticizing unit, a first metering unit for supply of a first compounding material to the plasticizing unit, and a second metering unit for supply of a second compounding material to the plasticizing unit of the injection molding machine, said method comprising the steps of:

ascertaining the volume of a mass stream of the compounded plasticized material downstream of the plasticizing unit in a continuous manner; and operating at least one of the first and second metering units in response to the continuously ascertained volume to control a composition of the plasticized material, wherein the operating step is implemented to correspond the volume of the mass stream downstream of the plasticizing unit to the volume of compounded material introduced by the respective metering unit into the plasticizing unit and, wherein the volume of the mass stream is determined on the basis of at least one of a cycle time and stroke volume of the injection unit.

6. The method of claim 5, for controlling such metering units by control units.

* * * * *